United States Patent
Wegner

(10) Patent No.: US 12,428,325 B2
(45) Date of Patent: Sep. 30, 2025

(54) METHOD AND SYSTEM OF REMOVING ENVIRONMENTAL CONTAMINANTS FROM WATER

(71) Applicant: Paul Charles Wegner, San Carlos, CA (US)

(72) Inventor: Paul Charles Wegner, San Carlos, CA (US)

( * ) Notice: Subject to any disclaimer, the term of this patent is extended or adjusted under 35 U.S.C. 154(b) by 0 days.

(21) Appl. No.: 17/861,317

(22) Filed: Jul. 11, 2022

(65) Prior Publication Data

US 2023/0009795 A1    Jan. 12, 2023

Related U.S. Application Data

(60) Provisional application No. 63/220,583, filed on Jul. 12, 2021.

(51) Int. Cl.
   *C02F 1/54*    (2023.01)
   *B01D 61/14*    (2006.01)
   (Continued)

(52) U.S. Cl.
   CPC .............. *C02F 1/54* (2013.01); *B01D 61/149* (2022.08); *B01D 61/16* (2013.01); *B01D 61/18* (2013.01);
   (Continued)

(58) Field of Classification Search
   CPC ...... C02F 1/54; C02F 1/444; C02F 2101/105; C02F 2101/203; C02F 2101/36; C02F 2301/043; C02F 2301/046; C02F 2305/00; C02F 11/10; C02F 2301/08; C02F 1/683; B01D 61/149; B01D 61/16; B01D 61/18; B01D 61/20; B01D 2311/04; B01D 2311/12; B01D 2311/252; B01D 2311/2642; B01D 2317/025; B01D 2317/08; B01D 61/145; B01D 61/58; B01D 61/147; B01D 2311/2523; B01D 2317/022; B01D 61/146
   See application file for complete search history.

(56) References Cited

U.S. PATENT DOCUMENTS 1,646,270 A    10/1927   Apeldorn
1,787,698 A    1/1931    Montgomery
(Continued)

FOREIGN PATENT DOCUMENTS

CA    1188645        6/1985
CN    1910116 A  *  2/2007
(Continued)

OTHER PUBLICATIONS

English language machine translation of CN105771913A, 15 pages, No Date.*
(Continued)

*Primary Examiner* — Pranav N Patel
(74) *Attorney, Agent, or Firm* — Head, Johnson, Kachigian &Wilkinson, PC

(57) ABSTRACT

A method and system of removing environmental contaminants from water comprising adding a fatty chemical to form a mixture with the water in which the fatty chemical and the environmental contaminants complex to form molecular complexes. The mixture is then filtered to remove the molecular complexes from the water.

16 Claims, 2 Drawing Sheets

(51) Int. Cl.
| | |
|---|---|
| *B01D 61/16* | (2006.01) |
| *B01D 61/18* | (2006.01) |
| *B01D 61/20* | (2006.01) |
| *C02F 1/44* | (2023.01) |
| *C02F 101/10* | (2006.01) |
| *C02F 101/20* | (2006.01) |
| *C02F 101/36* | (2006.01) |

(52) U.S. Cl.
CPC .............. *B01D 61/20* (2013.01); *C02F 1/444* (2013.01); *B01D 2311/04* (2013.01); *B01D 2311/12* (2013.01); *B01D 2311/252* (2022.08); *B01D 2311/2642* (2013.01); *B01D 2317/025* (2013.01); *B01D 2317/08* (2013.01); *C02F 2101/105* (2013.01); *C02F 2101/203* (2013.01); *C02F 2101/36* (2013.01); *C02F 2301/043* (2013.01); *C02F 2301/046* (2013.01); *C02F 2305/00* (2013.01)

(56) References Cited

U.S. PATENT DOCUMENTS

| | | |
|---|---|---|
| 2,754,261 A | 7/1956 | Akeroyd |
| 2,965,557 A | 12/1960 | Price |
| 3,215,624 A | 11/1965 | Frazer |
| 3,516,930 A | 6/1970 | Ross |
| 3,553,098 A | 1/1971 | Claridge |
| 3,775,088 A | 11/1973 | Higgins |
| 3,985,648 A | 10/1976 | Casolo |
| 4,120,775 A | 10/1978 | Murray |
| 4,321,145 A | 3/1982 | Carlson |
| 4,539,098 A | 9/1985 | Yudovich |
| 4,737,267 A | 4/1988 | Pao |
| 4,806,244 A | 2/1989 | Guilhem |
| 4,872,989 A | 10/1989 | Pirotta |
| 5,055,201 A * | 10/1991 | Wegner ................ C02F 1/54 210/729 |
| 5,078,900 A | 1/1992 | Wegner |
| 5,095,926 A | 3/1992 | Wegner |
| 5,273,647 A | 12/1993 | Tuszko |
| 5,348,588 A | 9/1994 | Winston |
| 5,534,136 A | 7/1996 | Rosenbloom |
| 5,658,459 A | 8/1997 | Guttormsen |
| 5,772,127 A | 6/1998 | Maciejewski |
| 5,811,012 A | 9/1998 | Tanabe |
| 5,814,224 A | 9/1998 | Khamizov |
| 5,925,255 A | 7/1999 | Mukhopadhyay |
| 5,997,745 A | 12/1999 | Tonelli |
| 5,998,640 A | 12/1999 | Haefele |
| 6,004,455 A | 12/1999 | Rendall |
| 6,113,797 A | 9/2000 | Al-Samadi |
| 6,247,480 B1 | 6/2001 | Wegner |
| 6,267,891 B1 | 7/2001 | Tonelli |
| 6,346,195 B1 | 2/2002 | Filson |
| 7,108,792 B2 | 9/2006 | Wegner |
| 7,399,366 B1 | 7/2008 | Wegner |
| 7,413,084 B2 | 8/2008 | Wegner |
| 7,438,129 B2 | 10/2008 | Heins |
| 7,439,054 B1 | 10/2008 | Maga |
| 7,562,664 B2 | 7/2009 | Wegner |
| 8,226,820 B1 | 7/2012 | Wegner |
| 8,986,503 B2 | 3/2015 | Kemp |
| 9,670,075 B1 | 6/2017 | Wegner |
| 10,252,921 B1 | 4/2019 | Wegner |
| 10,604,424 B1 | 3/2020 | Wegner |
| 10,683,223 B1 | 6/2020 | Wegner |
| 2001/0004962 A1 | 6/2001 | Hirota |
| 2002/0056690 A1 | 5/2002 | Wegner |
| 2002/0102229 A1 | 8/2002 | Wegner |
| 2002/0153319 A1 | 10/2002 | Mukhopadhyay |
| 2003/0015473 A1 | 1/2003 | Murphy et al. |
| 2003/0151024 A1 | 8/2003 | Wegner |
| 2003/0213367 A1 | 11/2003 | Kim |
| 2004/0050786 A1 | 3/2004 | Dey |
| 2004/0142834 A1 | 7/2004 | Wegner |
| 2005/0065052 A1 | 3/2005 | Wegner |
| 2005/0142096 A1 | 6/2005 | Wegner |
| 2005/0189301 A1 | 9/2005 | Wegner |
| 2005/0194319 A1 | 9/2005 | Wegner |
| 2005/0263740 A1 | 12/2005 | Wegner |
| 2006/0081503 A1 | 4/2006 | Wegner |
| 2007/0102359 A1 | 5/2007 | Lombardi |
| 2007/0114178 A1 | 5/2007 | Coppola |
| 2007/0131590 A1 | 6/2007 | Bozak |
| 2007/0205141 A1 | 9/2007 | Freeman |
| 2008/0060978 A1 | 3/2008 | Wegner |
| 2008/0156732 A1 | 7/2008 | Kearney |
| 2008/0272037 A1 | 11/2008 | Wegner |
| 2008/0296232 A1 | 12/2008 | Wegner |
| 2009/0057231 A1 | 3/2009 | Schelhaas |
| 2010/0147767 A1 | 6/2010 | Grott |
| 2010/0163489 A1 | 7/2010 | Bauder |
| 2010/0320155 A1 | 12/2010 | Enos |
| 2011/0000860 A1 | 1/2011 | Bland |
| 2013/0023408 A1 * | 1/2013 | Kambala ................ B01D 15/00 210/660 |
| 2014/0069821 A1 | 3/2014 | Marcin |
| 2015/0053620 A1 | 2/2015 | Suri |
| 2016/0040522 A1 | 2/2016 | Jacob |
| 2016/0122686 A1 * | 5/2016 | Dietz ..................... C07B 63/04 422/187 |
| 2016/0207797 A1 | 7/2016 | Boodoo |
| 2020/0339450 A1 | 10/2020 | Franceschi-Hofmann et al. |
| 2020/0376406 A1 | 12/2020 | Clerkin et al. |
| 2020/0378943 A1 * | 12/2020 | Buck ........................ C02F 1/008 |
| 2021/0008522 A1 | 1/2021 | Reeve et al. |
| 2022/0298029 A1 * | 9/2022 | Kullberg ................ B01D 61/16 |

FOREIGN PATENT DOCUMENTS

| | | | |
|---|---|---|---|
| CN | 105771913 A | * | 7/2016 |
| EP | 0050211 | | 9/1981 |
| EP | 0081016 | | 12/1981 |
| WO | 9212896 | | 7/1993 |
| WO | 9730010 | | 8/1997 |
| WO | 2011069189 | | 6/2011 |

OTHER PUBLICATIONS

English language machine translation of CN1910116A, 35 pages, No Date.*

Journal of Hazardous Materials 366 (2019) 160-168. (Year: 2019).*

Nadav "Boron removal from seawater reverse osmosis permeate utilizing selective ion exchange resin", Desalination (1999), 124(1-3), 131-135. (Year: 1999).

Wilcox et al. "Boron removal from high-purity water by selective ion exchange", Ultrapure Water (2000), 17(6), 40, 42-43, 45-46, 48-51, (Year: 2000).

EPA, "Standard operating procedure for calibration and maintenance of pH meters," SOP No. EQ-01-07, Nov. 25, 2014.

Ozer, A. et al. "A study on the Cr(VI) removal from aqueous solutions by steel wool"—Environmental Pollution vol. 97 No. 1-2 pp. 107-112, 1997 (Year: 1997).

DeSilva, Frank. Protecting ion exchange resins from suspended solids. Water Quality Products. Mar. 24, 2011. Available at <https://www.wqpmag.com/protecting-ion-exchange-resins-suspended-solids>, 2 pages. (Year: 2011).

Miller et al. Understanding ion-exchange resins for water treatment systems. General Electric Company. Jun. 2009, 13 pages. (Year: 2009).

Cheremisinoff, N.P. (2000). Handbook of Chemical Processing Equipment. Elsevier.

Svarovsky, L. (1990). Solid-Liquid Separations, 3rd ed., Butterworths.

U.S. Environmental Protection Agency; EPA-600/2-78-052; Jun. 1978; 310 Pages; Nitrate Removal From Water Supplies by Ion Exchange by Dennis A. Clifford and Walter J. Weber, Jr., of The University of Michigan, Ann Arbor, Michigan 48109; Grant No.

(56) References Cited

OTHER PUBLICATIONS

R-803898; Project Officer Thomas J. Sort, Water Supply Research Division U.S. EPA, Cincinnati, OH 45268.
Trademark of The Dow Chemical Company ("Dow") or an affiliated company of Dow; Form No. 609-00519-1206 FILMTEC MEMBRANES FILMTEC NF270 Nanofiltration Elements for Commercial Systems 2 Pages.
International Search Report and Written Opinion from Corresponding PCT Patent Application PCT/US2022/036622 Mailed Nov. 1, 2022; Korean Intellectual Property Office.

* cited by examiner

METHOD AND SYSTEM OF REMOVING ENVIRONMENTAL CONTAMINANTS FROM WATER

CROSS-REFERENCE

This application is based on and claims priority to U.S. Provisional Patent Application Ser. No. 63/220,583, filed Jul. 12, 2021, which is incorporated herein in its entirety by reference.

BACKGROUND OF THE INVENTION

1. Field of the Invention

This invention relates generally, but not by way of limitation, to a method and to a system of removing environmental toxins from water.

2. Description of the Related Art

Perfluorooctanesulfonic acid (PFOS), perfluorooctanoic acid (PFOA), and other perfluoroalkyl and polyfluoroalkyl substances (collectively, PFAS) have unique chemical properties. These chemicals can often be found in fire control foams, nonstick pans, microwave popcorn bags, stainmaster carpet, scotch guard, and many other industrial products. The molecules of these chemicals have polar heads, hydrophobic tails, and do not readily degrade in the environment. They are easily spread in the environment and are, therefore, increasingly pervasive in our water sources. These molecules can even be found in rainwater.

Unfortunately, these chemicals are also extremely toxic. When dispersed in water, these chemicals can have harmful effects even when the concentration is measured in parts per trillion (ppt). These chemicals tend to biomagnify in the environment and accumulate in humans. This accumulation has been shown to cause kidney and pancreatic cancer. Accordingly, the U.S. Environmental Protection Agency desires to reduce PFOS, PFOA, and certain other PFAS to concentrations of less than one ppt in drinking water. As a result, it is desirable to remove these toxins from water.

The prior art related to PFAS removal consists of adsorption of the contaminate onto a solid or having the PFAS precipitate as a solid. These methods fail to reduce the PFAS quantities in the water to the desired level. Further, these methods have a low loading capacity. This means that the amount of PFAS actively filtered is relatively low compared to the physical resources necessary to perform the filtering. The loading capacity of these methods is critically important because the concentrated waste is either placed in a landfill, or more preferably, incinerated. Incineration is the preferred method of disposal because it destroys the toxins. However, if the loading capacity of the filtration method is low, the energy required to incinerate the concentrated waste is inefficiently high.

Lastly, all of these aforementioned methods lack in selectivity of the toxins being filtered. In other words, each method may filter many other types of toxins which even further reduces the loading capacity with respect to PFAS.

By way of example, ion exchange and activated carbon have excellent initial performance at filtering toxins. However, once the outer surface of these filters is loaded with PFAS, the resin is exhausted and very little of the inner surface of the resin is used. As can be seen, these methods result in a low loading capacity and a high toxin leakage. To make matters worse, carbon has very poor selectivity and quickly becomes saturated with other contaminants. Ion exchange has slightly better selectivity but still collects other contaminants thereby reducing its ability to effectively filter PFAS to the desired levels. Lastly, membranes generate a high volume of concentrated waste that is economically impractical to destroy.

None of the above approaches focus on absorbing the unique hydrophobic tail of PFAS to form molecular complexes with fatty chemicals that remain in a highly dispersed state. This unique property allows for the removal of PFAS from water, while producing a concentrated molecular complex. Maintaining a highly dispersed molecular complex allows for rapid and complete complexation with PFAS.

Therefore, it is desirable to develop a method and a system of removing PFAS from water with a high loading capacity, minimal required fuel for incineration of the concentrated waste, a high level of selectivity, and the ability to filter these toxins to a concentration measured in ppt.

SUMMARY OF THE INVENTION

The present invention relates to a method and a system of removing environmental contaminants from water. In one embodiment, the invention relates to a method of removing environmental contaminants from water comprising: adding a fatty chemical to form a mixture with the water in which the fatty chemical and the environmental contaminants complex to form molecular complexes. The mixture is then filtered to remove the molecular complexes from the water.

The fatty chemical may be at least one of trimethylstearylamine (TMSA); trimethylbehenylamine (TMBA); stearyl choline; stearyl guanidine derivative, stearyl argininate esters; creatinine; and guanidine derivatives containing C12 to C22 hydrocarbon chains.

The filter may be of the type of at least one of crossflow, hollow fiber, or membranes with a micro- to ultra-filtration pore size.

The method may further comprise destruction of the PFAS removed from the water. The method of destruction may use steam plasma torch, incineration, or smoldering technology.

The environmental contaminants may be PFAS.

At least a portion of the mixture rejected by the filter may be recirculated with the feedwater to reduce the concentration of contaminants in the rejected water. At least another portion of the mixture rejected by the filter is filtered by a second filter to produce a waste containing the environmental contaminants removed from the feedwater.

Optionally, the method of removing environmental contaminants from water may include an optional step where the source of feedwater is filtered to remove phosphate, iron, and other transition metals prior to mixing with the fatty chemical.

DETAILED DESCRIPTION OF THE INVENTION

Figure 1:
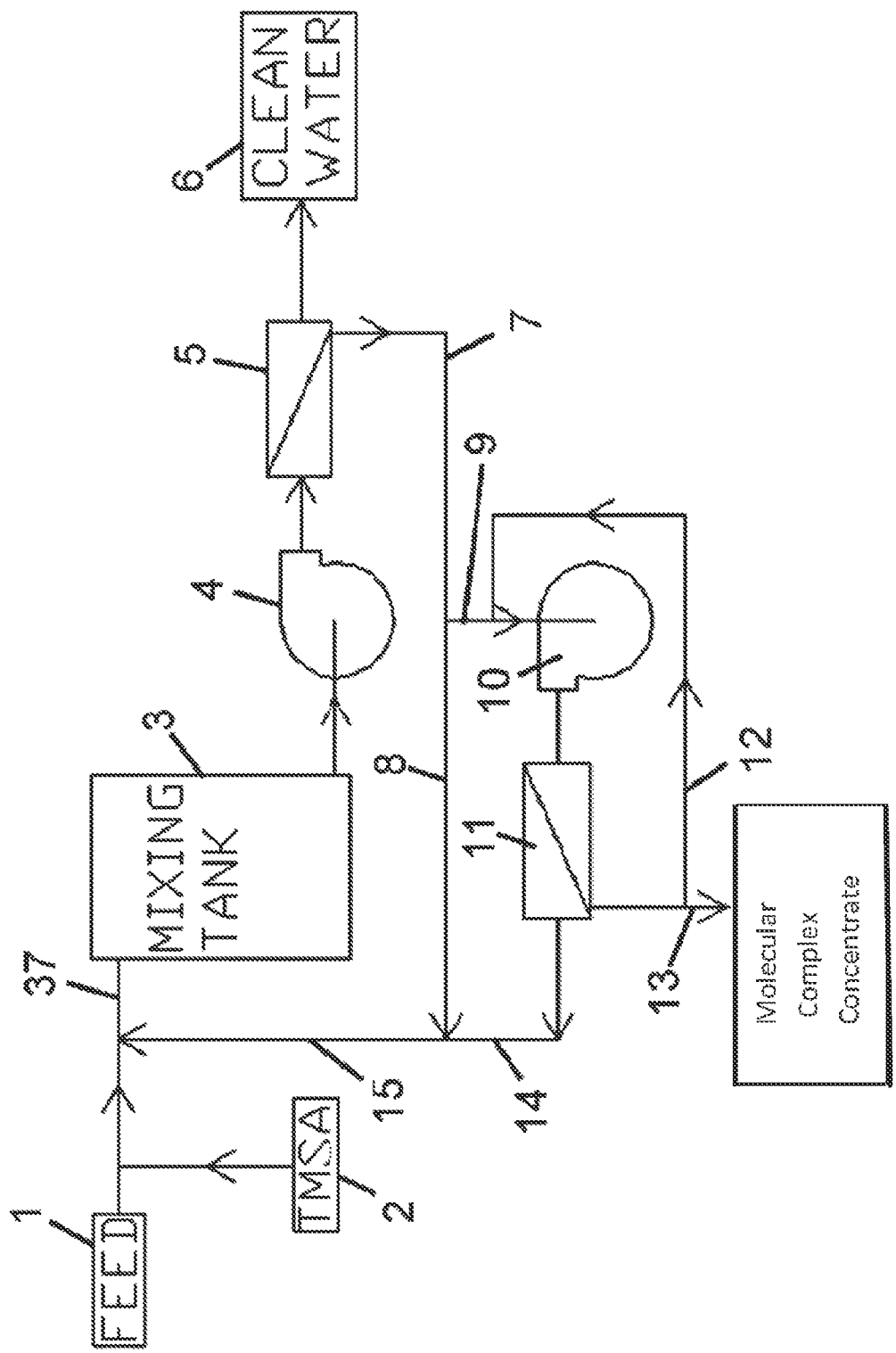
FIG. 1 is a flowchart showing the step-by-step process of one preferred embodiment of the present invention.

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

The present invention relates to a method and a system of removing PFAS and other toxins from water. The PFAS may be, but are not limited to, PFOS or PFOA which are extremely toxic and increasingly prevalent in our environment. These toxins form water soluble complexes with a broad spectrum of inorganic chemicals such as sodium, calcium, and magnesium; a host of transition metals; and a broad spectrum of organic chemicals such as amines and amino acids. This makes selective removal very difficult. Removing these chemicals to concentrations lower than one ppt requires use of chemicals which produce a water insoluble and chemically stable molecular complex that has a very large surface area to maximize removal speed and thoroughness. Additionally, it is desirable to use chemicals that are nontoxic.

The method comprises addition of a dispersible fatty chemical to the water. PFAS consist of non-polar, hydrophobic tails and very polar heads. In this case, the hydrophobic tails and polar heads form a molecular complex with the hydrophobic fatty chains and polar cationic head of the dispersible fatty chemical. Gathered in this way, these water insoluble molecular clusters are formed by the hydrophobic and polar head portions of the chemicals and water is generally pushed out of these clusters. These clusters form molecular complexes containing PFAS that are generally large enough to be removed from the water stream with a micro- to ultra-filtration pore size. Consequently, the filtered complex results in a permeate with lower concentrations of PFAS.

After the dispersible fatty chemical is added to a feedwater stream of the water, the stream may be mixed in a mixing tank. Mixing the stream in a mixing tank allows for the complex of TMSA and PFAS to form prior to reaching the filters. Otherwise, the molecular complexes may blind the filter inside the pores of membrane. Further, the present invention departs from known prior art by not adsorbing the contaminate onto a solid or forming solid particles or precipitations during the PFAS removal process. Consequently, the process allows for rapid and thorough removal without blinding or clogging the filters.

Due to the high loading capacity of fatty soaps, one can remove PFAS to very low concentration levels while producing a low volume of hazardous waste which may be destroyed with a variety of methods that include—but are not limited to—plasma torch, incineration, or smoldering technology. The resulting liquid and gases may then be returned to the feedwater to remove any traces of PFAS that were not destroyed.

A significant benefit to returning the resulting liquid and gases to the feedwater is that the fatty chemicals used in previous cycles can be returned and reused. Consequently, the fatty chemical content within the loop continuously builds up to higher concentrations. The increased concentration leads to an increased effectiveness in removing toxins without requiring more additives.

Additionally, PFAS require a high level of efficiency when being incinerated. A high level of incineration efficiency requires a significant amount of fuel. By returning the liquid and gases leftover from the incineration process to the feedwater, any remaining PFAS may be returned to the feedwater to be filtered again. This allows for a lower efficiency requirement in the incineration process and lower fuel consumption.

Polar amines such as TMSA or TMBA are useful complexing agents. They form water insoluble complexes with PFAS. The shorter C18 fatty amine, TMSA, is more easily dispersed in water than TMBA leading to faster PFAS complexing, while the longer C22 fatty amine, TMBA, forms larger molecular complex clusters that are easier to filter out.

Other analogs to TMSA and TMBA include stearyl choline, stearyl guanidine derivative, stearyl arginate esters, creatinine, and guanidine derivatives containing C12 to C22 hydrocarbon chains. In the broadest sense, the complexing agent comprises a polar head and a hydrophobic tail.

Optionally, in order to remove most substances (such as phosphate, iron, and other transition metals) that may compete with PFAS during the TMSA/TMBA complexing process, the feedwater may be filtered using a crossflow filter prior to adding TMSA/TMBA to the water stream.

The filters utilized by the present invention may be micro- to ultra-filtration pore size, which allows one to filter out all the molecular complexes and naturally occurring suspended solids while still allowing most water-soluble chemicals to pass freely. Crossflow filters are preferred, but hollow fiber and membranes are acceptable.

The concentrated toxic waste may be destroyed in any reasonable manner. Examples of acceptable destruction methods include steam plasma torch, incineration, and smoldering technology. Since all the resulting waste water and gases may be returned to the feedwater for reprocessing, complete destruction of PFAS is not critical.

Referring to the drawings in detail, FIG. 1 illustrates the step-by-step process of one preferred embodiment of the claimed method for removing PFAS from water. The first step comprises adding TMSA 2 to feedwater 1 prior to the stream entering a mixing tank 3. In one non-limiting example, the TMSA concentration is roughly 10 ppm and the reaction time of the mixing tank is roughly 10 minutes. The water from the mixing tank 3 is pumped by a pump 4 through the first filter 5. The permeate of the first filter 5 is a clean water stream 6 from which the PFAS have largely been removed. The stream rejected by the first filter 5 is fed back into the mixing tank 3. A portion of the stream rejected by the first filter 5 is bled off and pumped by a pump 10 through a second filter 11. The permeate of the second filter 11 is returned to the mixing tank 3 and the reject stream is returned to the suction side of pump 10. A portion of the stream rejected by the second filter 11 is bled off as PFAS molecular complex concentrate 13. The PFAS molecular complex concentrate 13 may then be destroyed in any reasonable manner.

Figure 2:
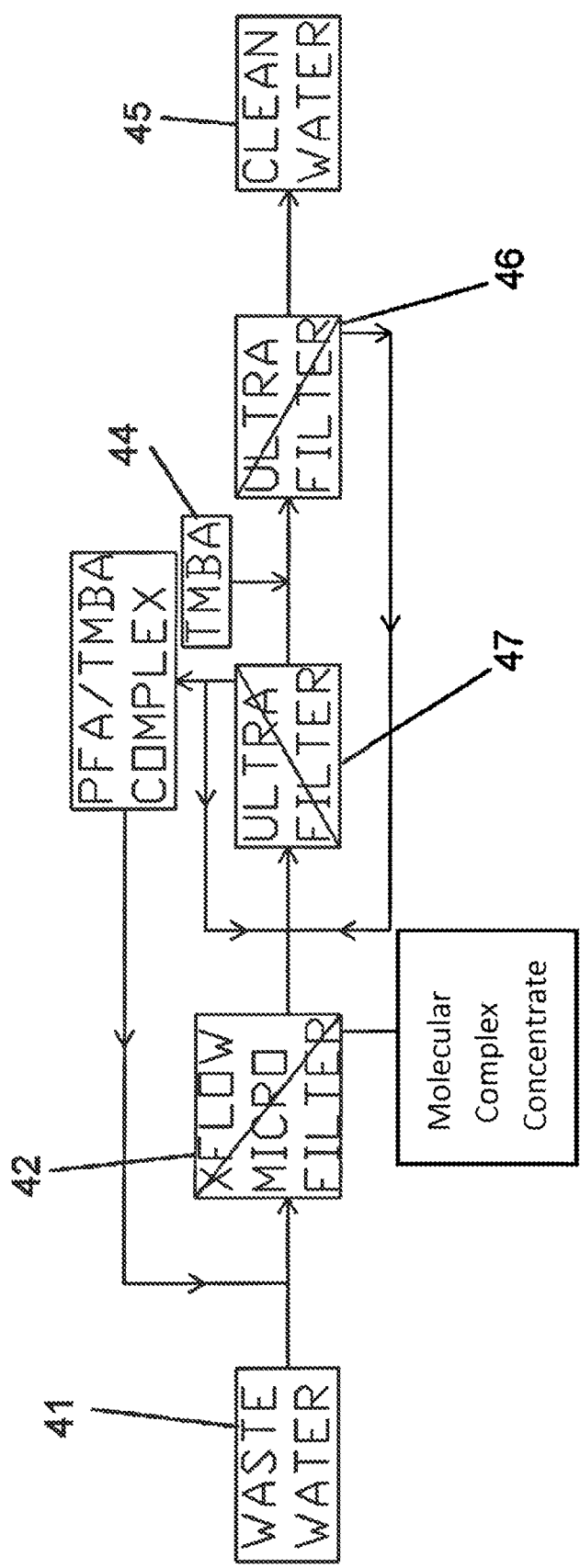
FIG. 2 is a flowchart showing the step-by-step process of a second preferred embodiment of the present invention.

FIG. 2 illustrates the step-by-step process of a second preferred embodiment of the claimed method for removing PFAS from water. The first step comprises running the feedwater 41 through a crossflow filter 42 to remove phosphate, iron, and other transition metals which may compete with PFAS during the TMBA/TMSA complexing process. The permeate of the crossflow filter is fed into a first ultra-filter 47 before TMBA 44 is added to the stream. After TMBA is added to the stream, the stream is passed through a second ultra-filter 46. The permeate of the second ultra-filter is a clean water stream 45. The rejected stream of the second ultra-filter is fed back into the first ultra-filter 47. The rejected stream of the first ultra-filter is fed into the crossflow filter 42 while a portion is fed back into the first ultra-filter 47. The rejected stream of the crossflow filter 42 is bled off as PFAS molecular complex concentrate 48.

Whereas, the invention has been described in relation to the drawings attached hereto, it should be understood that other and further modifications, apart from those shown or suggested herein, may be made within the scope of this invention.

What is claimed is:

1. A method of removing environmental contaminants from water comprising:
   mixing a source of feedwater, having environmental contaminants therein, and a fatty chemical comprising trimethylstearylamine to form a mixture in which the fatty chemical and the environmental contaminants complex to form molecular complexes;
      where the molecular complexes are not formed by a process of adsorption onto a solid, and
      where the molecular complexes do not form a solid or solid particles in the mixture; and
   filtering the mixture with a filter to remove the molecular complexes from the feedwater.

2. The method of removing environmental contaminants from water of claim 1 where the filter is of the type of at least one of crossflow, hollow fiber, or membranes each with a micro- to ultra-filtrations pore size.

3. The method of removing environmental contaminants from water of claim 1 further comprising an additional step of destruction of the environmental contaminants removed from the water.

4. The method of removing environmental contaminants from water of claim 3 where the method of destruction of the environmental contaminants uses plasma torch, incineration, or smoldering technology.

5. The method of removing environmental contaminants from water of claim 1 where the environmental contaminants removed from the water are at least one of perfluorooctanesulfonic acid, perfluorooctanoic acid, or other perfluoroalkyl and polyfluoroalkyl substances.

6. The method of removing environmental contaminants from water of claim 1 where at least a portion of the mixture rejected by the filter is recirculated with the incoming feedwater.

7. The method of removing environmental contaminants from water of claim 6 where another portion of the mixture rejected by the filter is filtered by a second filter to produce a waste containing the environmental contaminants removed from the feedwater.

8. The method of removing environmental contaminants from water of claim 1 where the source of feedwater is filtered to remove phosphate, iron, and other transition metals prior to mixing with trimethylstearylamine.

9. The method of removing environmental contaminants from water of claim 1 wherein the concentration of trimethylstearylamine in the mixture is 10 ppm.

10. A method of removing environmental contaminants from water comprising:
    filtering a source of feedwater having environmental contaminants therein with a microfiltration filter;
    adding a fatty chemical comprising trimethylstearylamine to a permeate stream from the microfiltration filter to form a mixture in which the fatty chemical and the environmental contaminants complex to form molecular complexes;
        where the molecular complexes are not formed by a process of adsorption onto a solid, and
        where the molecular complexes do not form a solid or solid particles in the mixture;
    passing the mixture through an ultrafiltration filter;
    collecting a permeate stream from the ultrafiltration filter as clean water; and
    collecting a reject stream from the ultrafiltration filter containing a molecular complex concentrate having the environmental contaminates therein.

11. The method of removing environmental contaminants from water of claim 10 where the environmental contaminants removed from the water are at least one of perfluorooctanesulfonic acid, perfluorooctanoic acid, or other perfluoroalkyl and polyfluoroalkyl substances.

12. The method of removing environmental contaminants from water of claim 10 comprising an additional step of sending a reject stream from the ultrafiltration filter through the microfiltration filter.

13. The method of removing environmental contaminants from water of claim 10 comprising an additional step of passing the permeate stream of the microfiltration filter through a second ultrafiltration filter prior to adding trimethylstearylamine to form a mixture.

14. The method of removing environmental contaminants from water of claim 13 comprising an additional step of passing the reject stream from the second ultrafiltration filter through the microfiltration filter.

15. The method of removing environmental contaminants from water of claim 13 comprising an additional step of sending a reject stream from the ultrafiltration filter through the second ultrafiltration filter.

16. The method of removing environmental contaminants from water of claim 13 comprising an additional step of sending a reject stream from the ultrafiltration filter through the microfiltration filter.

* * * * *